Jan. 7, 1941.   R. H. KOENIG   2,228,010
MANUFACTURE OF GLASS TUBES
Filed March 29, 1938   6 Sheets-Sheet 1

INVENTOR.
Robert H. Koenig
BY Charles B. Belknap
ATTORNEY.

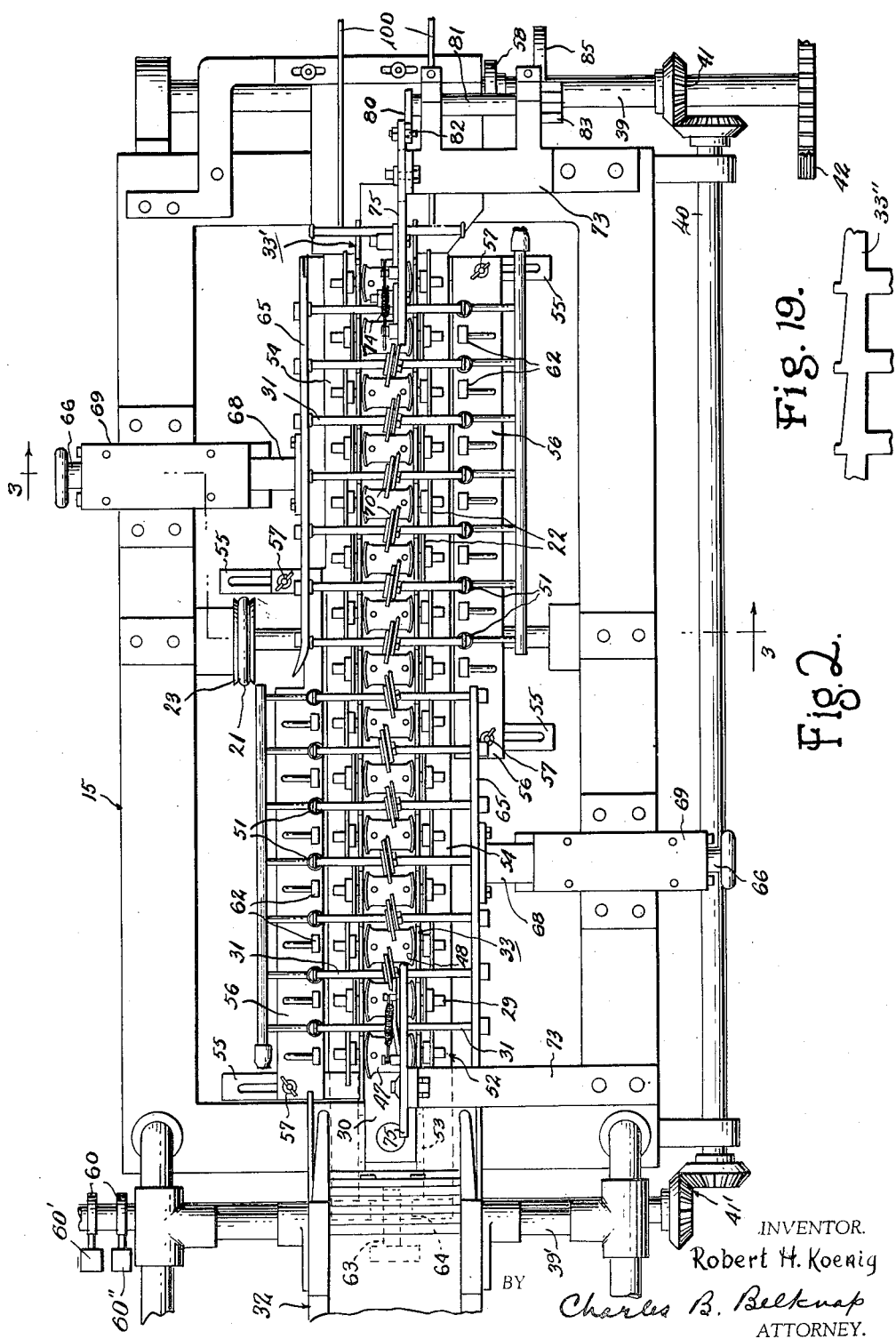

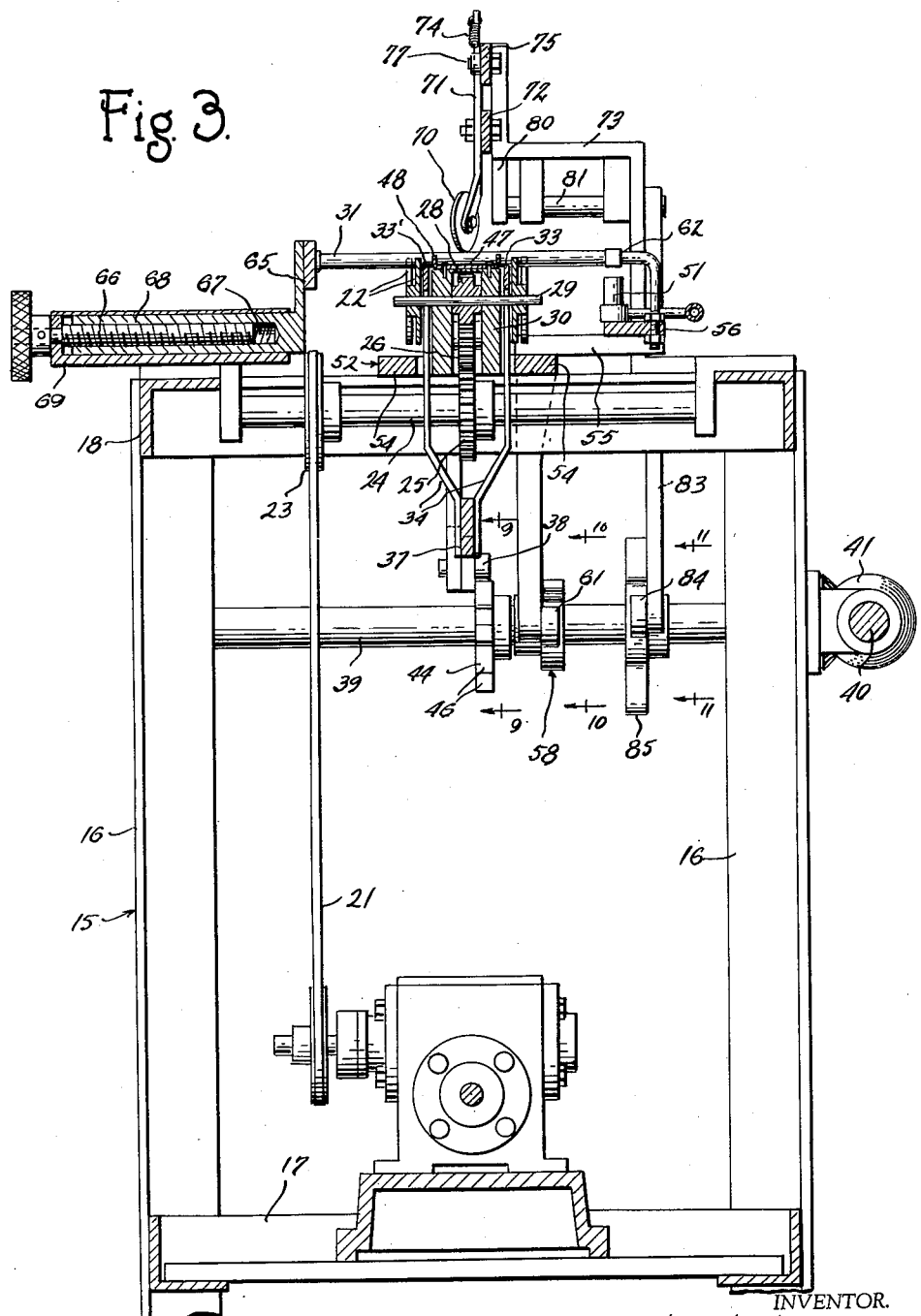

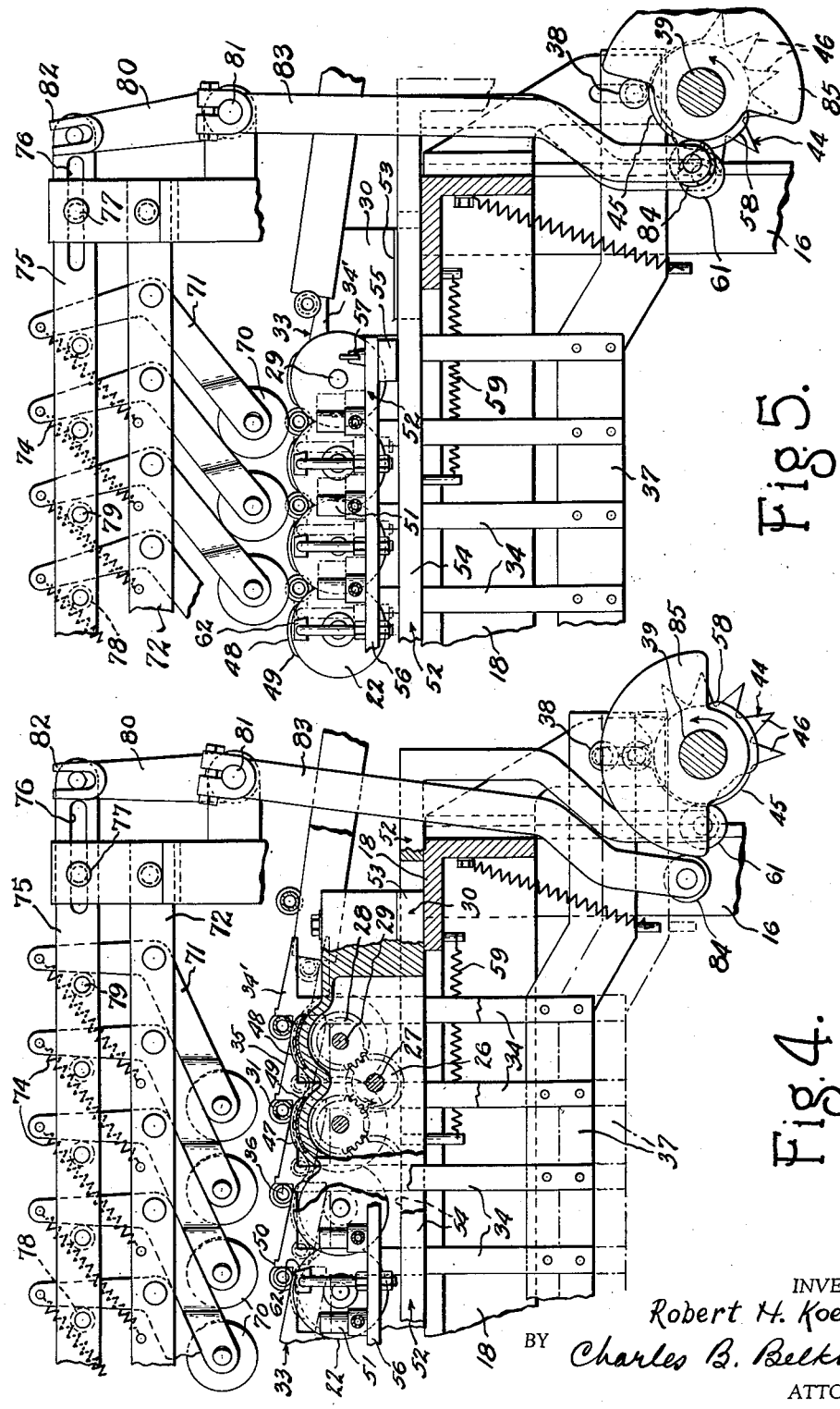

Jan. 7, 1941.   R. H. KOENIG   2,228,010
MANUFACTURE OF GLASS TUBES
Filed March 29, 1938    6 Sheets-Sheet 5
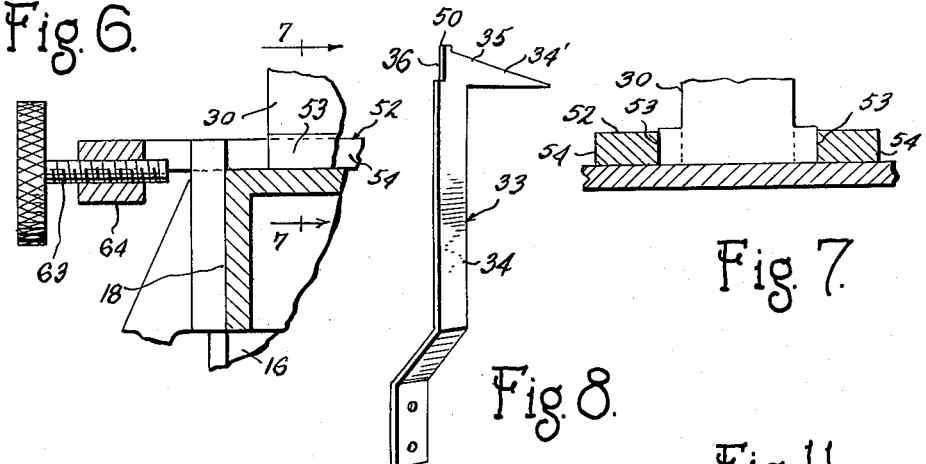
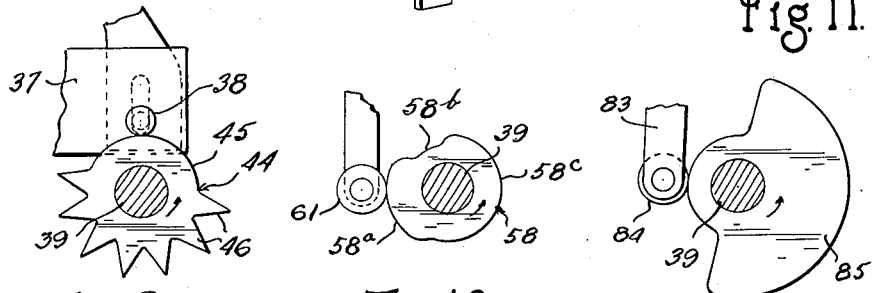
Fig. 16.
Fig. 17.
Fig. 18.
INVENTOR.
Robert H. Koenig
BY Charles B. Belknap
ATTORNEY.

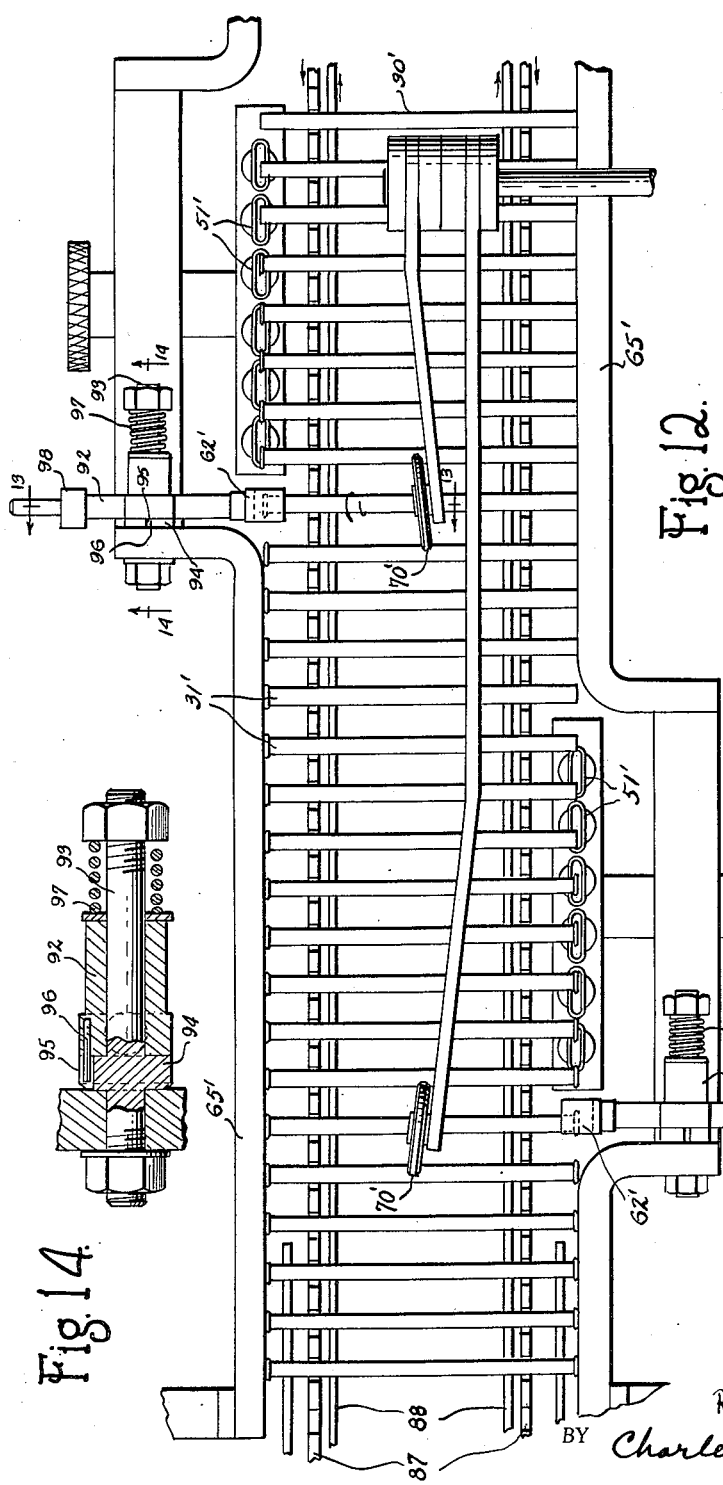

Patented Jan. 7, 1941

2,228,010

UNITED STATES PATENT OFFICE 2,228,010

MANUFACTURE OF GLASS TUBES

Robert H. Koenig, Haddon Heights, N. J., assignor to Kimble Glass Company, Vineland, N. J., a corporation of Illinois Application March 29, 1938, Serial No. 198,757

8 Claims. (Cl. 49—7)

The present invention pertains to the manufacture of glass tubes having flared ends, and more particularly to a method and apparatus for smoothing and accurately finishing the flared ends of the tubes.

One of the methods commonly utilized for flaring or lipping the ends of glass tubes, such as those used in combination with rubber bulbs for drawing and expelling liquid from the tube, is that wherein the end of a tubular glass blank is heated and then pressed against a flat surface to spread the end. Not only are the flanges thus formed easily broken, but their diameters vary considerably since there is no way of accurately gauging the diameter of the flange.

It is one of the objects of this invention to form the flange by centrifugal force, that is, rapidly rotating the tube blank while the end thereof is molten and plastic, and to limit the diameter of the annular lips by suitable tools.

It is another object of the invention to provide mechanism for carrying out the aforementioned steps, this mechanism comprising novel blank transporting means, means for imparting rotation to the blanks, and means for presenting tools or abutments to the flanges in timed relation to their transportation through the machine to accurately shape the flanges.

Other objects will be apparent from the following description of a preferred method of manufacturing tubes and one form of the apparatus employed, this apparatus being illustrated in the accompanying drawings, in which:

Fig. 2 is a top plan view of the machine;

Fig. 3 is a sectional view of the machine taken on line 3—3 of Fig. 2;

Fig. 4 is a fragmentary view partly in section illustrating the arrangement of certain cams in the machine;

Fig. 5 is a view similar to Fig. 4 showing the cams and other parts in different positions;

Fig. 6 is a fragmentary sectional view of an adjustable tool limiting stop;

Fig. 7 is a sectional view taken on line 7—7 of Fig. 6;

Fig. 8 is a perspective view of one of the rack elements;

Fig. 9 is a fragmentary section taken on line 9—9 of Fig. 3;

Fig. 10 is a fragmentary section taken on line 10—10 of Fig. 3;

Fig. 11 is a fragmentary section taken on line 11—11 of Fig. 3;

Fig. 12 is an enlarged partial top view of a continuously moving endless conveyor type machine, the gauge tool being a modified form of that shown in Figs. 1 and 5;

Fig. 13 is a partial sectional view of the gauge tool taken on line 13—13 of Fig. 12;

Fig. 14 is a section taken on line 14—14 of Fig. 12;

Fig. 15 is a section taken on line 15—15 of Fig. 13;

Figure 1:
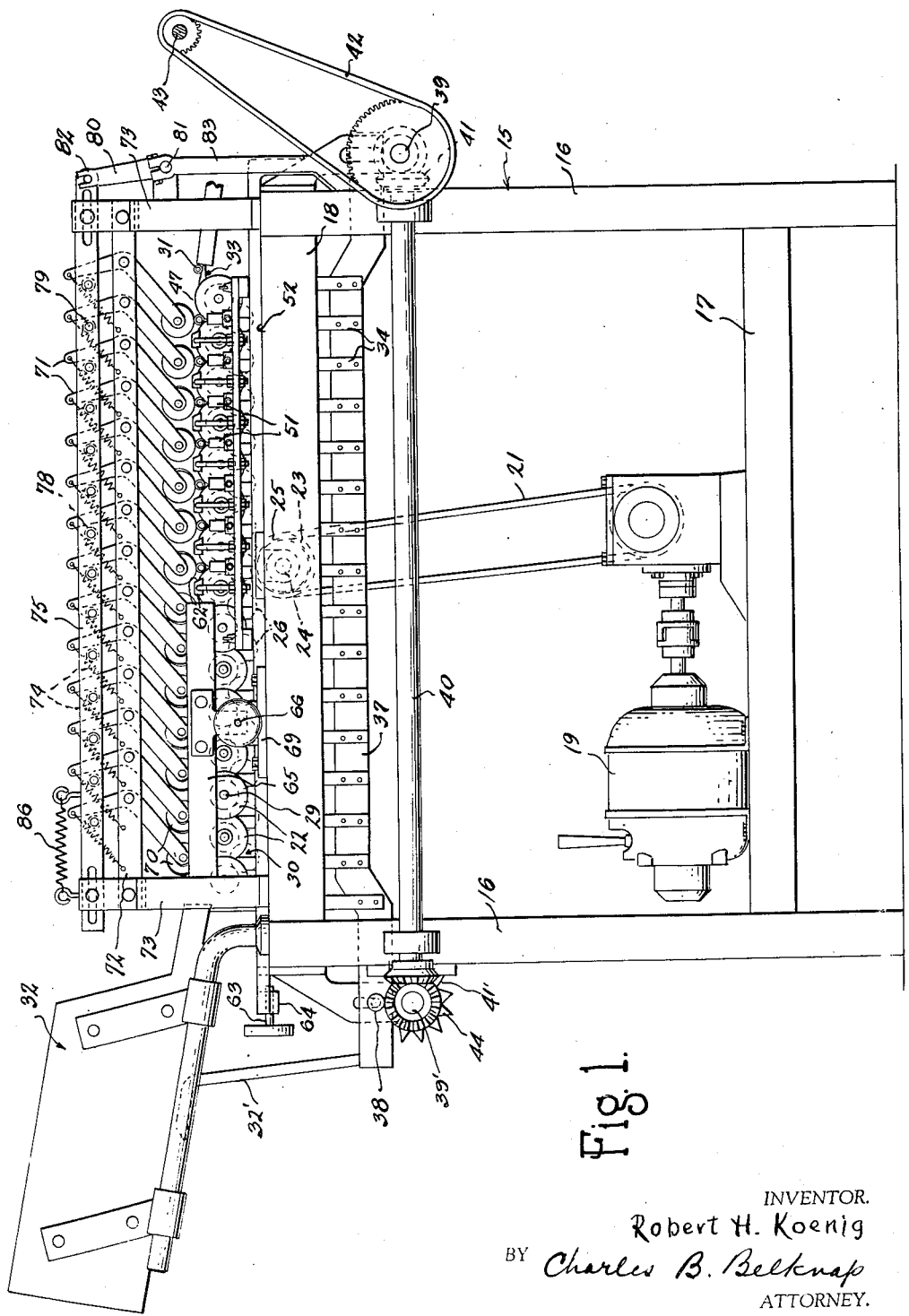
Fig 1 is a front elevation of a preferred embodiment of the invention.

Figs. 16, 17, and 18 illustrate the successive steps in lipping two ends of a tubular glass blank;

Fig. 19 is a fragmentary elevation of a modified form of rack teeth.

Referring to the drawings, the mechanism is supported on a generally box-like frame 15 having uprights 16, lower frame members 17, and upper frame members 18. Motor 19 is supported on the lower members and, by means of belt 21, drives discs 22 of which there are fifteen on each side of the medial line of the machine.

The means for driving the discs include pulley 23 on jack shaft 24, on which is keyed or otherwise secured gear 25, intermediate gears 26 on shafts 27, and gears 28 on spaced parallel shafts 29 meshing with gears 26, the latter shafts also carrying discs 22. As will be seen in Figs. 2 and 4, shafts 27 and 29 are journaled in a longitudinally disposed casting 30 secured to the frame. It is obvious that all of the discs are rotated in the same direction and, as will be seen from Fig. 1, adjacent discs are arranged in staggered relation so that their peripheries overlap to form saddles for supporting the blanks. Thus the glass blanks 31 are not only supported at their ends by opposite pairs of discs, but the discs also impart rotation to the blanks.

The machine shown in the drawings is designed to flare fourteen blanks simultaneously, seven blanks being flared at one end, while at the same time another seven are flared at the opposite ends of the blanks. The means for transporting the plain tube blanks from hopper or magazine 32 to and through the flaring apparatus include a pair of racks 33, 33', comprising a series of standards 34 having substantially triangular lateral extensions or fingers 34' forming adjacent and abutting rack teeth, the upper inclined faces 35 and adjacent substantially vertical faces 36 forming recesses. An agitating finger 32' is secured to the rack bars, and means are provided for vertically reciprocating the racks and finger. As shown in Figs. 3, 4, and 5, the standards 34 converge towards their lower ends and are connected to a longitudinal bar 37.

Journaled on bar 37 adjacent each end thereof are cam followers or rollers 38 cooperating with cams 44 on cross shafts 39, 39'. These latter shafts are driven in opposite directions, but at the same angular velocity, it being apparent that shaft 39' is driven by shaft 39 through shaft 40 and bevel gearing 41, 41'. Shaft 39 is driven through chain or belt 42 from shaft 43, the latter being part of apparatus for performing subsequent operations on the blanks, and, since it forms no part of the present invention, is not shown herein.

The cams 44 have a relatively long dwell portion 45 and seven risers 46. In the position shown in Fig. 5, and by the dot and dash lines in Fig. 4, the followers are resting on dwell portion 45, at which time the rack is lowered and the blanks rest on discs 22. When the cam risers lift the racks to the position indicated by solid lines in Fig. 4, the rack teeth are raised until the lowest point on each of inclined faces 35 is elevated above the tops of the discs, the blanks, in consequence, being lifted from the discs and permitted to roll down the inclined faces towards the vertical faces 36. These vertical faces are so positioned to one side of the axes of the discs that, when the rack is lowered, each blank is transferred to the next pair of rack teeth 34' to be supported thereon. Thus, with seven successive vertical reciprocations of the rack, seven blanks are taken from the magazine 32 and deposited successively on adjacent rack teeth.

The first blank, for instance, will have been elevated seven times and moved successively to adjacent rack teeth until it rests between the seventh and eighth discs of the series, while the seventh blank will have been lifted once and deposited between the first and second discs of the series. The long dwell on the cams then permits the seven blanks to remain for some time at a predetermined position wherein they are heated at one end and rotated rapidly to flare them, as will be explained hereinafter.

After being flared at one end (see Fig. 17), the seven blanks are positioned in a similar manner on the remaining discs (from the eighth to the fifteenth discs), at which time the other ends of the blanks are flared (see Fig. 18). Adjacent each disc is a stationary arcuate guide plate 47 which is U-shaped in section, providing flanges 48, the edge of each flange being elevated above the periphery of the disc and concentric therewith, a portion 49 thereof having an inclined edge which aids in the deposition of the blanks between the rack teeth. The apex of each rack tooth is preferably provided with a straight side lug or projection 50, the purpose of the projection being to prevent the blanks from rolling up the incline and over the apex, if, by chance, they should be spinning too rapidly when lifted by the rack. This action is possible when the spin given to the blank is in a direction opposite to the roll of the blanks down the inclined face of the rack tooth. In the present machine the discs rotate in a direction to spin the blanks in this manner.

The rack teeth 34' and the flanges 48 may be so designed that, during the transfer from one pair of teeth to the next adjacent teeth, the blanks will not come in contact with the rotating discs. However, when the last riser on cam 44 passes follower 38 and the latter rests on the dwell portion of cam 44, all of the blanks will be supported on and rotated by the discs. After the blanks have been lipped at both ends the racks will deposit the finished blanks on the discharge chute indicated at 100.

As stated hereinbefore, when the blanks are lowered to rest on the seat formed by adjacent discs, rollers 38 ride on the long dwell portion of cams 44 and the blanks are then spun rapidly. At the same time, one end of each blank is locally heated to plasticity so that centrifugal force causes the molten end of the blank end to flare or flow radially outwardly, thereby forming an annular lip on the blank. The means for heating the blank ends comprise a plurality of burners 51, in the present instance fourteen, spaced apart a distance equal to that between the axes of adjacent discs and adapted to be positioned directly under the blank ends while they are being spun.

It is to be noted that seven of the burners are disposed in alignment along one side of the machine to heat an end of each of the first seven blanks, while the remaining seven burners are disposed on the opposite side of the machine to heat the other end of blanks which have first been shaped by the first seven burners. All of the burners are mounted on a reciprocable carriage 52 slidable along guideways 53 formed at each end of the casting 30 (see Fig. 7). The carriage comprises a rectangular frame, the side members 54 of which have connected thereto lateral slotted arms 55 to which plates 56 supporting the burners and tools are adjustably secured by thumb nuts 57. It will thus be seen that the tools and burners may be positioned to act on blanks of different lengths.

Referring to Fig. 10, it will be seen that cam 58 on shaft 39 provides for three positions of the carriage on which the gauging tools and burners are mounted. In one position the carriage is urged to the position shown in Fig. 5, wherein the burners underlie and heat the blank ends by the high portion 58a of the cam. Normally the carriage is moved to the right in Figs. 4 and 5 by spring 59, the ends of which are connected respectively to the frame and to the carriage, the low portion 58b of the cam permitting the springs to urge the carriage to the right a distance limited only by stop means to be described hereinafter. The portion 58c of the cam positions the burner somewhat to one side of the axis of the blank, at which time the blank is preliminarily heated.

While the blanks are resting on and being rotated by the discs, the burners are brought into underlying relation therewith, as indicated by solid lines in Fig. 5, but, during the lipping and blank transfer operations, the burners are moved to one side, as shown by the dot and dash lines in Fig. 5, the air and gas supply thereto being simultaneously diminished. Keyed or otherwise secured to shaft 39' are cams 60 designed to cut down the supply of gas and air to the burners during the lipping operation. At the same time follower 61 on the carriage rides on the low portion 58b of cam 58 and permits spring 59 to move the carriage to the right in Fig. 1, thereby displacing burners 51 and moving gauging or shaping tools 62, also supported by the carriage, to the position indicated by dot and dash lines in Fig. 5, so that the tools engage the lips formed on the blank ends before the blanks are elevated and hence still spinning. The lip being still plastic, its diameter is definitely limited by the shaping action of the tool.

To insure proper positioning of the tools when the carriage is moved by spring 59 and to vary the operative position of the tools, a stop pin 63, shown in Fig. 6, is threaded in a lug 64 on the carriage and abuts the end of the frame. Thus, the tools move to a definite position with respect to the blanks when drawn by spring 59, the pin 63 preventing the carriage from moving beyond a position wherein the tools are in accurate diameter limiting and gauging relation with the lips on the blanks. It is obvious, of course, that pin 63 is adjustable to accommodate the tools to blanks of various diameters.

It will be seen that there is a tool for each burner and that the tools are spaced similarly to the burners in fixed relation thereto and laterally of the tube ends, so that the shaping of blanks is done immediately after they have been lipped by centrifugal force. As the burners move away from the blanks, cams 60 operate gas and air supply valves 60', 60''. It is apparent, of course, that, when the cams rotate through a certain angle, cam 58 again returns the burners to underlie the blanks and the gas and air valves are again opened.

On each side of the machine is a guide rail 65 extending substantially half the distance between the end discs and opposite the burners and tools. This rail serves as a back stop for the end of the blank opposite that being lipped. Each guide rail is adjustable transversely, screw 66 cooperating with an internal thread 67 on an extension 68 of the rail and being fixed with respect to member 69 secured to the frame. Above the discs are a plurality of skew rollers or discs 70 journaled for rotation on bell crank levers 71, the latter being pivotally mounted on bar 72 secured to brackets 73 fixed on the machine frame. The discs 70 are so disposed with respect to the supporting discs 22 that they engage the blanks while they are being rotated and, being skewed as shown in Fig. 3, force them against the guide rail 65. In this way the blank ends are held in alignment while being heated and shaped.

The angularity of the discs at the forward end of the machine is, of course, opposite that of the remaining discs for the reason that the respective guide rails are on opposite sides of the machine. The levers 71 are normally urged to the position shown in Fig. 5 by springs 74 fastened to the levers and to bar 72, as illustrated. When the blanks are being transferred, it is necessary to elevate discs 70 and this is done by rocking the bell crank levers.

Just above bar 72 is a second bar 75 mounted for reciprocating movement with respect to bar 72, slots 76 adjacent the ends of bar 75 and bolts 77 passing through the slots and through suitable openings in brackets 73 provided for this purpose. Rollers 78, one for each lever, are fastened to bar 75 by bolts 79. The bar is reciprocated periodically to lift discs 70, that is, during tube transfer, by a rocker arm 80 secured to shaft 81 and having at one end a fork 82. Arm 83 is also fastened to shaft 81 and has a cam follower 84 at its other end cooperating with cam 85 on shaft 39.

Normally bar 75 is urged towards the left in Fig. 1 by spring 86, but, when the tubes are to be transferred, a riser portion on cam 85 rocks arms 80 and 83 to move the bar to the right. Upon such movement rollers 78 engage levers 71 and elevate discs 70 which remain elevated until the rack 33 has reciprocated seven times to transfer a like number of tube blanks. The discs 70 are then lowered by springs 74 to permit them to perform their function of urging the blanks towards the guide rails on either side of the machine.

In Figs. 12 to 15 are shown modifications of the machine and gauge tool. The machine illustrated in Fig. 12 is one in which the blank conveyor and rotating means is continuously movable. In the particular apparatus shown, a pair of notched discs 87 support the blanks 31' in spaced parallel relation, these discs rotating continuously. A second pair of discs 88, rotating at a speed greater than that of discs 87, are so arranged that they engage the blanks to spin them while the blank ends are heated. The blanks pass through the flames of burners 51' which melt the ends of the blanks and, after being flared by centrifugal force, the flared ends of the blanks are acted upon by gauging tools 62'. Each of the tools comprises a shaper having converging plane faces 89, 89', substantially parallel with the path of travel of the blank, the short distance between the faces being equal to the desired diameter of the finished lipped end of the blank. As in the preferred form of the machine shown in Fig. 2, guide rails 65' are provided against which the blanks are urged by skew discs 70'.

Each of the shaper tools has an integral stud 90 fitting into a recess 91 in bracket 92. This bracket is swingably mounted on shaft 93, the latter being secured to rail 65'. As will be seen in Fig. 14, the shaft has an enlarged portion 94 intermediate its ends in which is an opening or notch 95 with which pin 96 on bracket 92 cooperates to hold the bracket and tool in fixed relation to the path of travel of the blanks. Spring 97 urges the bracket against the enlarged portion of the shaft so that pin 96 rests in the notch but permits the bracket to be drawn away to release the pin so as to permit the tool to be swung out of the path of the blanks when desired. Preferably, a counterweight 98 is adjustably secured to bracket 92 to balance the shaper tool.

While certain of the details have been shown as illustrative of preferred forms of these details, it is obvious that they may be modified. For instance, the transfer racks might each comprise a single toothed bar or be made of a number of substantially triangular pieces 33'' secured to or formed integral with standards 36 in juxtaposed relation, as shown in Fig. 4. The lip limiting tools may each be provided with an inclined side for engaging the lip, as shown in Fig. 5, or, in a machine such as shown in Fig. 12, the tool may be U-shaped to engage the lipped end at diametrically opposite points.

The machine illustrated in Figs. 1 and 2 is one in which the movement of the tube blanks through the machine is substantially rectilinear. The method of shaping the tubes is equally applicable to rotary machines, that is, those employing a drum for transporting the blank over the heating flames and past the end shaping tools, as shown in Fig. 12. It is, therefore, not intended that the method described herein be limited to the specific embodiment of the invention shown in the drawings.

What is claimed is:

1. In a machine for lipping a tubular glass blank having an open end, heating means for plasticizing said open end of the blank, means for rotating the blank while the open end thereof is plastic to form thereon by centrifugal force a radially outward annular lip, gauging means engageable with the plastic lip thus formed for limiting the diameter thereof, and means for alternately moving the heating means and gauging means into heating and engaging relation respectively to the said end of said blank.

2. In a machine for lipping a tubular glass blank having an open end, heating means for plasticizing said open end of the blank, means for rotating the blank while the open end thereof is plastic to form thereon by centrifugal force a radially outward annular lip, a gauging tool movable into predetermined engaging relation with said plastic lip to limit the diameter thereof, and means for alternately moving the heating means into heating relation with said end and the tool into said predetermined engaging relation with said lip.

3. In a machine for lipping a tubular glass blank, heating means for plasticizing an end of the blank, means for rotating the blank while the end thereof is plastic to form thereon by centrifugal force a radially outward annular lip, a gauging tool movable into engaging relation with said plastic lip to limit the diameter thereof, means for moving the heating means into heating relation with said end, means for urging said tool into engaging relation with said lip, and means for limiting the engaging relation of said tool with said lip.

4. In a machine for lipping tubular glass blanks, a carriage on one side of the machine having thereon a plurality of equally spaced heating means and a plurality of similarly equally spaced gauging tools, a second carriage on the opposite side of the machine and spaced from the first mentioned carriage longitudinally of the machine, said second carriage having thereon heating means and gauging tools spaced similarly to those on the first carriage, means for supporting a plurality of glass blanks in spaced relation to each other and in predetermined relation to said heating means and tools, said supporting means being adapted to rotate said blanks to form by centrifugal force radially outward annular lips at the ends of the blanks when said ends are plasticized by said heating means, means for reciprocating said carriages to alternately move the heating means into heating relation with the blanks and the tools into predetermined diameter limiting engagement with the plastic lips of the blanks, and means for transferring said blanks from aligned relation with the first carriage to aligned relation with said second carriage.

5. In a machine of the class described, a plurality of spaced heating means, a plurality of spaced parallel shafts, a disc at each end of each shaft, said discs being so disposed that each pair of adjacent discs is adapted to form a saddle for supporting a blank in proximity to one of the heating means, the peripheries of adjacent discs being in overlapped relation to form a supporting saddle, a plurality of reciprocable elevating fingers, one disposed adjacent each disc, said fingers each having a face disposed in vertical alignment with said saddle and a second face inclined downwardly towards and beyond the axis of one of the discs forming the saddle, and a cam having a plurality of risers for reciprocating said fingers to transfer a blank successively from one saddle to the next adjacent saddle, said cam having a dwell portion to permit reciprocation of the fingers to be arrested while the blanks are being heated.

6. In a machine of the class described, a plurality of spaced parallel shafts, a disc at each end of each shaft, said discs being so disposed that each pair of adjacent discs is adapted to form a saddle for supporting a blank, the peripheries of adjacent discs being in overlapped relation to form a supporting saddle, a plurality of reciprocable elevating fingers, one disposed adjacent each disc, said fingers each having a face disposed in vertical alignment with said saddle and inclined downwardly towards and beyond the axis of one of the discs forming the saddle, means for reciprocating said fingers to transfer a blank from one saddle to the next adjacent saddle, and an arcuate guide plate adjacent each disc and extending vertically above and beyond the periphery thereof to maintain the blanks in spaced relation to the disc while being transferred.

7. In a machine of the class described, a plurality of spaced parallel shafts, a disc at each end of each shaft, said discs being so disposed that each pair of adjacent discs is adapted to form a saddle for supporting a blank, the peripheries of adjacent discs being in overlapped relation to form a supporting saddle, a plurality of reciprocable elevating fingers, one disposed adjacent each disc, said fingers each having a face disposed in vertical alignment with said saddle and inclined downwardly towards and beyond the axis of one of the discs forming the saddle, a vertical abutment at the upper end of said inclined face to prevent a blank from rolling over said upper end, and means for reciprocating said fingers to transfer a blank from one saddle to the next adjacent saddle.

8. In a machine for lipping tubular glass blanks, a carriage on one side of the machine having thereon a plurality of equally spaced heating means and a plurality of similarly equally spaced diameter limiting tools, means for supporting a plurality of glass blanks in spaced relation to each other and in predetermined relation to said heating means and tools, said supporting means being adapted to rotate said blanks to form by centrifugal force radially outward annular lips at the ends of the blanks when said ends are plasticized by said heating means, means for periodically transferring blanks to and from said supporting means, and means for moving said heating means into heating relation with the blanks, then the tools into predetermined diameter limiting engagement with the plastic ends of the blanks, and then maintaining the heating means and diameter limiting means in spaced relation to the blanks when the transfer means is actuated.

ROBERT H. KOENIG.